United States Patent [19]

Muhr

[11] Patent Number: 4,930,192
[45] Date of Patent: Jun. 5, 1990

[54] HOSE CLAMP

[75] Inventor: Rudolf Muhr, Attendorn, Fed. Rep. of Germany

[73] Assignee: Muhr und Bender, Attendorn, Fed. Rep. of Germany

[21] Appl. No.: 347,295

[22] Filed: May 4, 1989

[30] Foreign Application Priority Data

Sep. 28, 1988 [DE] Fed. Rep. of Germany ....... 3832875

[51] Int. Cl.$^5$ .............................................. B65D 63/02
[52] U.S. Cl. ................................ 24/20 R; 24/20 CW; 24/20 EE
[58] Field of Search ............ 24/20 R, 20 CW, 20 TT, 24/20 S, 20 EE, 20 W, 23 R, 23 W, 23 EE, 25

[56] References Cited

U.S. PATENT DOCUMENTS

| | | | |
|---|---|---|---|
| 1,277,076 | 8/1918 | Ireland | 24/20 CW |
| 1,379,476 | 5/1921 | Parr | 24/20 CW |
| 2,472,172 | 6/1949 | Ovens et al. | 24/20 S |
| 2,629,908 | 3/1953 | Keck | 24/20 S |
| 4,275,484 | 6/1981 | Irio et al. | 24/23 EE |
| 4,425,681 | 1/1984 | Ilius | 24/20 S |
| 4,517,708 | 5/1985 | Calmettes et al. | 24/20 CW |
| 4,750,242 | 6/1988 | Calmettes et al. | 24/20 R |
| 4,773,129 | 9/1988 | Muhr | 24/20 EE |

FOREIGN PATENT DOCUMENTS 2470275 6/1981 France ........................ 24/20 R

*Primary Examiner*—Victor N. Sakran
*Attorney, Agent, or Firm*—Browdy and Neimark

[57] ABSTRACT

In a hose clamp having a resilient clamp body (2) substantially annularly surrounding one hose end and having tightening ends (6, 7) that overlap one another and are bent substantially radially away from the clamp body (2), in which a certain inside diameter prevails in the relaxed state, and the clamp body (2) can be spread apart to a considerably greater diameter counter to its own spring force with the aid of a tightening tool engaging the tightening ends (6, 7), and one tightening end (6) is embodied as an inverted U and the other tightening end (7) is embodied in protrusionlike fashion and is disposed between the U legs of one tightening end (6) with its free end approximately at the radial height of the crossbar of the U of the one tightening end (6), and the one tightening end (6), for forming a shackle (8), is bent back toward the other tightening end (7) substantially at a tangent or in a circumferentially curved manner, at a certain radial distance from the clamp body (2), and the tightening ends (6, 7) in the spread-apart state of the clamp body (2) are interlocked with one another and for clamping a hose end are unlocked from one another, the danger of unintentional unlocking is reduced, yet intentional unlocking is still easily attainable, by providing that the shackle (8) at the free end of the one tightening end (6) is bent at the end as a detent hook (9) radially inward onto the clamp body (2), and in the spread-apart state grips the free end of the other tightening end (7) lockingly from behind.

7 Claims, 1 Drawing Sheet

HOSE CLAMP

FIELD OF THE INVENTION

The invention relates to a hose clamp having a resilient clamp body substantially annularly surrounding one hose end and having tightening ends that overlap one another and are bent substantially radially away from the clamp body; in the relaxed state, a certain inside diameter prevails (clamping state), and the clamp body can be spread apart to a considerably greater diameter (spread-apart state) counter to its own spring force with the aid of a tightening tool engaging the tightening ends. One tightening end is embodied as an inverted U, while the other tightening end is embodied in protrusionlike fashion and is disposed between the U legs of one tightening end with its free end approximately at the radial height of the crossbar of the U of the one tightening end; to form a shackle, the one tightening end is bent back toward the other tightening end substantially at a tangent or in a circumferentially curved manner at a certain radial distance from the clamp body. In the spread-apart state of the clamp body the tightening ends are interlocked with one another; for clamping a hose end, they are unlocked from one another. Preferably, the shackle is made from the material of the one tightening end by bending a tongue of the material radially from the outside inward.

BACKGROUND OF THE INVENTION

Hose clamps of this type (German Patent No. 30 41 106, German Patent No. 36 33 486) are intended and suited particularly for hose systems having average internal pressures, such as motor vehicle engine coolant systems, where internal pressures during operation of a maximum of 2 bar can be expected. Typically, such hose systems are tested at up to 3 bar. The pressuretight seat of a hose end on an attachment fitting of such a hose system is assured on the one hand by the intrinsic elasticity of the hose end itself, which is usually a rubber hose or rubber-plastic hose with reinforcing fabric and so forth, and on the other hand by the spring force of the hose clamp referred to above. That is, the known hose clamp is not tightened by a separate tightening element, such as a tightening screw, in order to bring about the pressuretight seat of a hose end on a connection fitting; instead, the spring force of the correspondingly severely prestressed hose clamp itself assures the pressuretight seat. The force that must be brought to bear by a tool on the tightening ends of the hose clamp in order to spread a hose clamp apart to a considerably greater diameter, typically a maximally limited diameter, counter to its own spring force is correspondingly great. This diameter must suffice to move the hose clamp easily, up to some intended position, over the hose end is seated on the connection fitting.

The known hose clamp referred to above is slipped onto the connection fitting or onto the hose end in the spread-apart state. To this end, the two tightening ends are already interlocked with one another in the spread-apart state of the clamp body at the factory. On site, before the hose clamp is installed in a hose system, the tightening ends need merely be unlocked from one another, as soon as the hose clamp is located at the intended position. As a result, a special tightening tool for manipulation on site is not necessary. For unlocking, the shackle need merely be pulled radially outward, so that it slides downward from the end, embodied as a detent protrusion, of the other tightening end. Because only a substantially radial displacement of the detent protrusion relative to the detent recess in the shackle is necessary for unlocking here, the unlocking can be performed with a relatively slight exertion of force, since the effective spring force of the hose clamp in the spread-apart state is directed substantially at a tangent.

Functionally, the known hose clamp is particularly suitable and in particular is easily unlocked. This hose clamp is also favorable from a manufacturing standpoint as well as in terms of cost, because it is made completely in one piece. However, it has been found in practice that excessively often, the tightening ends still come unlocked unintentionally, in particular before the clamp has been installed on the connection fitting or on the hose end.

SUMMARY OF THE INVENTION

It is the object of the present invention to embody and improve the known hose clamp such that the danger of unintentional unlocking is reduced, yet intentional unlocking remains as easy as before.

This object is attained in accordance with the invention in that the shackle at the free end of the one tightening end is bent at the end as a detent hook radially inwardly onto the clamp body, and in the spread-apart state grips the free end of the other tightening end lockingly from behind. The locking achieved according to the invention in the spread-apart state, via a detent hook gripping the free end of the other tightening end from behind has been found in practice to more reliable in protecting against unintentional unlocking than the provisions previously made, which had a detent protrusion or the like entering into a detent recess.

Preferred embodiments and features of the teaching of the invention are the subject of the dependent claims and will also be described in further detail below in combination with the description of a preferred exemplary embodiment, referring to the drawings.

DESCRIPTION OF THE PREFERRED EMBODIMENT

Figure 1:
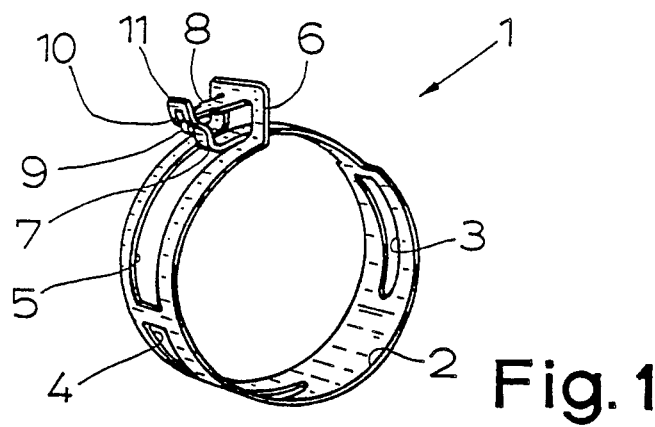
FIG. 1 is a perspective view showing a hose clamp according to the invention in the spread-apart state.

The hose clamp 1 shown in the drawings has a resilient clamp body 2 substantially annularly surrounding a hose end, not shown. The clamp body 2 has various stamped-out recesses 3, 4, 5 to attain a predetermined spring characteristic or to meet certain geometrical preconditions. Tightening ends 6, 7 overlapping one another are also embodied on the clamp body 2. The hose clamp 1 in the relaxed state has an inside diameter that is smaller than the corresponding outside diameter of the hose end, not shown, in the relaxed state (clamping state) and can be spread apart (spread-apart state) to a considerably larger diameter contrary to its intrinsic spring force with the aid of a tightening tool, not shown in the drawings, engaging the tightening ends 6, 7. The tightening ends 6, 7 may be disposed and/or arranged such that upon attaining a certain maximally spread-apart state they come to rest blockingly against one another. In any case, the arrangement is such that the hose clamp 1 snaps back in the direction of the clamping state by its own spring force as soon as it is released by the tightening tool.

Figure 2:
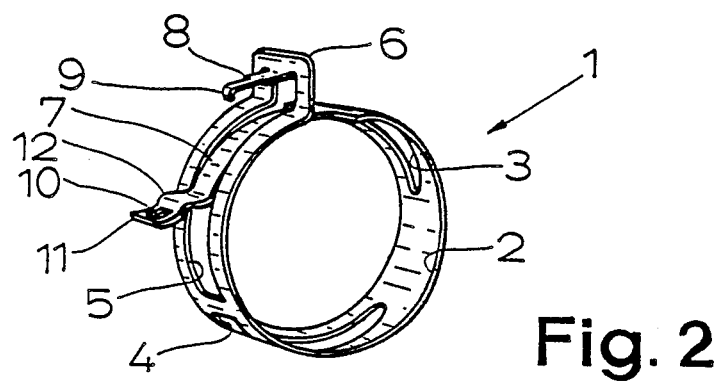
FIG. 2 shows the hose clamp of FIG. 1 in the clamping state.

An essential feature of the hose clamp 1 shows is that the tightening ends 6, 7 are interlocked with one another in the spread-apart state of the clamp body 2 (FIG. 1), and are unlocked from one another for clamping a hose end (FIG. 2). Thus it is essential that although the hose clamp 1 is initially capable of being brought into the spread-apart state with the tightening tool, the hose clamp 1 then maintains this spread-apart state on its own; that is, after that, the tightening tool is no longer needed for manipulating the hose clamp 1. In particular, this means that the hose clamp 1 can be slipped on site, without a tightening tool, onto a hose end to be secured, and that then, in the intended position of the hose clamp 1, the tightening ends 6, 7 need merely be unlocked from one another, in order to return the hose clamp 1 into its clamping state.

For the concrete embodiment of the hose clamp 1 shown, the drawings show that one tightening end 6 is embodied as an inverted U, while the other tightening end 7 is in the form of a protrusion and is disposed between the U legs of one tightening end 6 with its free end at approximately the radial height of the U crossbar of that end 6. The one tightening end 6 is bent back onto the other tightening end 7 substantially at a tangent or with a circumferential curve at a certain radial distance from the clamp body 2, in the illustrated exemplary embodiment at a distance of approximately 8 mm. In the exemplary embodiment shown, which is the preferred embodiment, the shackle 8 is formed by bending a tongue of the material of the tightening end 6 radially from the outside inward. For this purpose, the stamped recess 5 in the tightening end 6 is drawn radially outward, so that the tightening end 7, likewise protruding radially outward, can enter in between the legs of the tightening end 6 through the stamped recess 5.

An essential feature for the teaching of the invention is that the shackle 8, at the free end of one tightening end 6, is bent at the end radially inward toward the clamp body 2 to form a detent hook 9 and in the spread-apart state grips the free end of the other tightening end 7 interlockingly from behind. In the exemplary embodiment shown, the detent depth of the hook 9 is from 2 to 3 mm. The width of the clamp body 2 in the exemplary embodiment shown is approximately 15 mm, while the material thickness (wall thickness) of the hose clamp 1 is on the order of 0.5 to 2.5 and preferably approximately 1.5 mm.

In principle, the detent hook 9 could be wider than the free end of the other tightening end 7, or could be at least the same width. However, to facilitate intentional unlocking, it is recommended in accordance with a preferred teaching of the invention that the detent hook 9 have a considerably lesser width than the free end of the other tightening end 7, preferably a width of approximately 2 mm.

Because the tightening ends 6, 7 of the hose clamp 1 overlap one another both in the spread-apart state and in the clamping state, it is already assured at the outset that the tightening end 7 is laterally guided between the edges of the stamped recess 5 that form the tightening end 6. Similarly, one source of risk, as before, of an unintentional unlocking of the tightening ends 6, 7, especially if a hose clamp 1 should unintentionally drop on the floor, has been found to be that the detent hook 9 is displaced laterally with respect to the free end of the tightening end 7. Here a remedy is provided in the exemplary embodiment shown in the drawings, in that an approximately U-shaped engagement opening 10 for the detent hook 9 is provided on the free end of the other tightening end 7. As a result, a lateral displacement of the detent hook 9 is prevent when the tightening ends 6, 7 are interlocked.

A particularly suitable feature, as shown in the drawings, is for the engagement opening 10 to be closed on the radially outer side by a crossbar 11, or in other words for it not to be U-shaped but rather to be approximately O-shaped. This assures that the intentional unlocking can be accomplished in a particularly easy way. That is, a radially inwardly directed force can be exerted upon the crossbar 11 and optionally at the same time a radially outwardly directed force can be exerted upon the shackle 8 with the detent hook 9, in order to effect the intentional unlocking of the two tightening ends 6, 7. The exertion of the radially inward force would be more difficult to attain in terms of tools if the engagement opening 10 were merely U-shaped, or if there were no engagement opening at all.

It has already been mentioned that the tightening ends 6, 7 may be disposed and/or embodied in such a way that upon attaining a certain maximally spread-apart state they come to rest blockingly against one another. In the preferred exemplary embodiment shown, this is assured particularly simply in that the shackle 8, beginning at the U crossbar of the one tightening end 6, initially has a greater width than the engagement opening 10, but beyond a certain distance, preferably a distance of approximately 3 to 4 mm from the end bent to form the detent hook 9, is reduced to the width of the detent hook 9. The shoulder thus formed, which is spaced apart from the end bent to form the detent hook 9, serves as a blocking stop in the manner described above.

Figure 3:
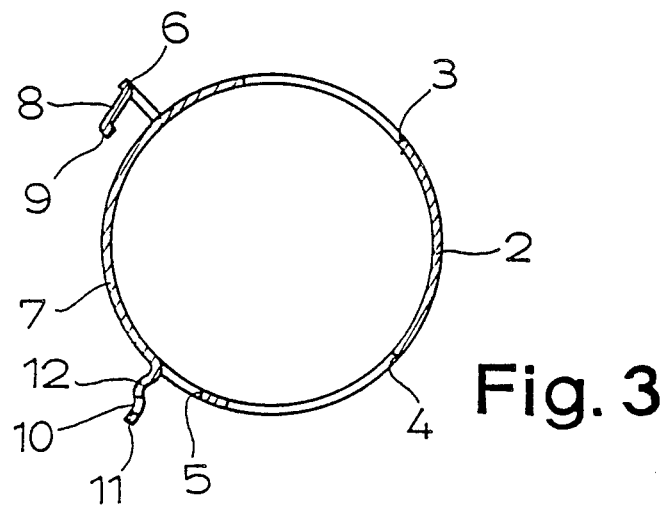
FIG. 3 shows the hose clamp of FIG. 1 in section.

Thus far the advantages of the hose clamp 1 according to the invention have been discussed primarily in terms of the unlocking. The hose clamp 1 constructed in accordance with the invention, in the exemplary embodiment shown, is also particularly advantageous in terms of locking, because in the illustrated example (see FIG. 3 in particular) the locking can be accomplished particularly easily. To this end, the hose clamp 1 is embodied such that the other tightening end 7, below the free end, or in other words below the engagement opening 10, has a run-up incline 12; preferably it is bent approximately in an S to form the run-up incline 12. The S-shaped bend of the tightening end 7 to form the run-up incline 12 is naturally relatively flat. By means of this bend, it is additionally attained that the free end of the tightening end 7 is rigidified by the detent hook 9 with respect to the tangentially exerted forces.

As the drawing and description of the hose clamp 1 according to the invention show, the manipulation recesses known in the prior art are no longer necessary here, because of the skillful embodiment of the hose clamp 1 according to the invention.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

I claim:

1. A hose clamp having a resilient clamp body and a first tightening end and a second tightening end, said tightening ends overlapping each other, said tightening ends being bent substantially radially away from said clamp body;

said clamp body being adapted and constructed to have a certain inside diameter in the clamping state and being able to be spread apart to a considerably greater diameter counter to its own spring force in the spread-apart state;

said first tightening end being in the shape of an inverted U;

said second tightening end being in the form of a protrusion, said second tightening end being disposed between the legs of the U of said first tightening end, a free end of said second tightening end being about at the radial height of the crossbar of the U of said first tightening end;

wherein said first tightening end is bent back toward said second tightening end substantially at a tangent or in a circumferentially curved manner at a predetermined radial distance from said clamp body;

wherein said tightening ends in the spread-apart state of said clamp body interlock with one another and in the clamping state are unlocked from one another;

wherein a shackle is made by bending a tongue of said first tightening end radially from the outside inwardly;

wherein the shackle at the free end of said first tightening end is bent at the end in the manner of a detent hook radially inwardly onto the clamp body, said shackle in the spread-apart state gripping the free end of the other tightening end lockingly from behind;

wherein said detent hook has a considerably lesser width than the free end of said second tightening end; and wherein a generally U-shaped engagement opening for said detent hook is provided on the free end of said second tightening end.

2. The hose clamp according to claim 1 wherein the locking depth of said detent hook is from about 2 to about 3 mm.

3. The hose clamp according to claim 1 wherein the engagement opening on the radially outer side is closed by a crossbar.

4. The hose clamp according to claim 1 wherein the shackle, beginning at the crossbar of the U of the first tightening end, initially has a width greater than said engagement opening, and said shackle is reduced to the width of said detent hook.

5. The hose clamp according to claim 4 wherein said shackle is reduced in width to the width of said detent hook 3 to 4 mm from the end that is bent to form said detent hook.

6. The hose clamp according to claim 1 wherein said second tightening end is bent generally in an S shape.

7. The hose clamp according to claim 1 wherein said detent hook has a width of substantially 2 mm.

* * * * *